US012175136B2

(12) United States Patent
Takeichi (10) Patent No.: US 12,175,136 B2
(45) Date of Patent: Dec. 24, 2024

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Jumpei Takeichi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/459,259

(22) Filed: Aug. 31, 2023

(65) Prior Publication Data

US 2024/0078053 A1    Mar. 7, 2024

(30) Foreign Application Priority Data

Sep. 2, 2022  (JP) ................. 2022-139685

(51) Int. Cl.
G06F 3/12        (2006.01)
H04W 84/12       (2009.01)

(52) U.S. Cl.
CPC .......... *G06F 3/1203* (2013.01); *G06F 3/1236* (2013.01); *H04W 84/12* (2013.01)

(58) Field of Classification Search
CPC ..... G06F 3/1203; G06F 3/1236; H04W 84/12
USPC ....................................... 358/1.15
See application file for complete search history.

(56) References Cited

U.S. PATENT DOCUMENTS

2019/0050174 A1*  2/2019  Tajima ................ H04L 12/1886
2022/0174674 A1*  6/2022  Mapar ................... H04W 72/54

FOREIGN PATENT DOCUMENTS

JP          2016127545 A      7/2016

* cited by examiner

*Primary Examiner* — Allen H Nguyen
(74) *Attorney, Agent, or Firm* — Canon U.S.A., Inc. IP Division (57) ABSTRACT

A control method of an information processing apparatus including a predetermined program for causing a printing apparatus to perform printing includes executing predetermined processing for using a second network for communication by the predetermined program on a basis that the information processing apparatus belongs to a first network and the second network in parallel, wherein the first network is formed by an external apparatus and based on a predetermined wireless communication standard, and the information processing apparatus functions as a station in the first network, and wherein the second network is formed by the printing apparatus, not connected to Internet, and based on the predetermined wireless communication standard, and the information processing apparatus functions as a station in the second network, and performing communication with the printing apparatus using the second network after the predetermined processing is executed.

20 Claims, 5 Drawing Sheets

INFORMATION PROCESSING APPARATUS, CONTROL METHOD, AND STORAGE MEDIUM

BACKGROUND

Field

The present disclosure relates to an information processing apparatus, a control method, and a storage medium.

Description of the Related Art

A mode where an information processing apparatus such as a smartphone and a communication apparatus such as a printer are connected via a network has been known (for example, Japanese Patent Application Laid-Open No. 2016-127545).

Information processing apparatuses having a function capable of simultaneously belonging to a plurality of networks, such as a Wireless Fidelity (Wi-Fi®) station/station (STA/STA) Concurrency function (STA/STA function), have become prevalent. Accordingly, there has been a demand for improvement in the convenience of such an information processing apparatus capable of simultaneously belonging to a plurality of networks.

SUMMARY

The present disclosure is directed to improving the convenience of an information processing apparatus that simultaneously belongs to a plurality of networks in a case where the information processing apparatus is connected to a plurality of communication paths by the same communication method.

According to an aspect of the present disclosure, a control method of an information processing apparatus including a predetermined program for causing a printing apparatus to perform printing includes executing predetermined processing for using a second network for communication by the predetermined program on a basis that the information processing apparatus belongs to a first network and the second network in parallel, wherein the first network is formed by an external apparatus and based on a predetermined wireless communication standard, and the information processing apparatus functions as a station in the first network, and wherein the second network is formed by the printing apparatus, not connected to Internet, and based on the predetermined wireless communication standard, and the information processing apparatus functions as a station in the second network, and performing communication with the printing apparatus using the second network after the predetermined processing is executed.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. It should be understood that modifications and improvements made to the following exemplary embodiments as appropriate based on the ordinary knowledge of those skilled in the art without departing from the gist of the present disclosure are also included in the scope of the present disclosure.

An information processing apparatus and a communication apparatus included in a communication system according to a first exemplary embodiment will be described. In the present exemplary embodiment, a smartphone will be described as an example of the information processing apparatus. However, the information processing apparatus is not limited thereto, and various apparatuses such as a mobile terminal, a laptop personal computer (PC), a tablet terminal, a personal digital assistant (PDA), and a digital camera can be applied. In the present exemplary embodiment, a printer will be described as an example of the communication apparatus. However, the communication apparatus is not limited thereto, and various apparatuses capable of wireless communication with the information processing apparatus can be applied. Examples of applicable printers include an inkjet printer, a full-color laser beam printer, and monochrome printer. The communication apparatus is not limited to printers, and can also be applied to a copying machine, a facsimile apparatus, a mobile terminal, a smartphone, a laptop PC, a tablet terminal, a PDA, a digital camera, a music player device, and a television set. A multifunction peripheral having a plurality of functions including a copy function, a facsimile (FAX) function, and a print function is also applicable.

Figure 1:
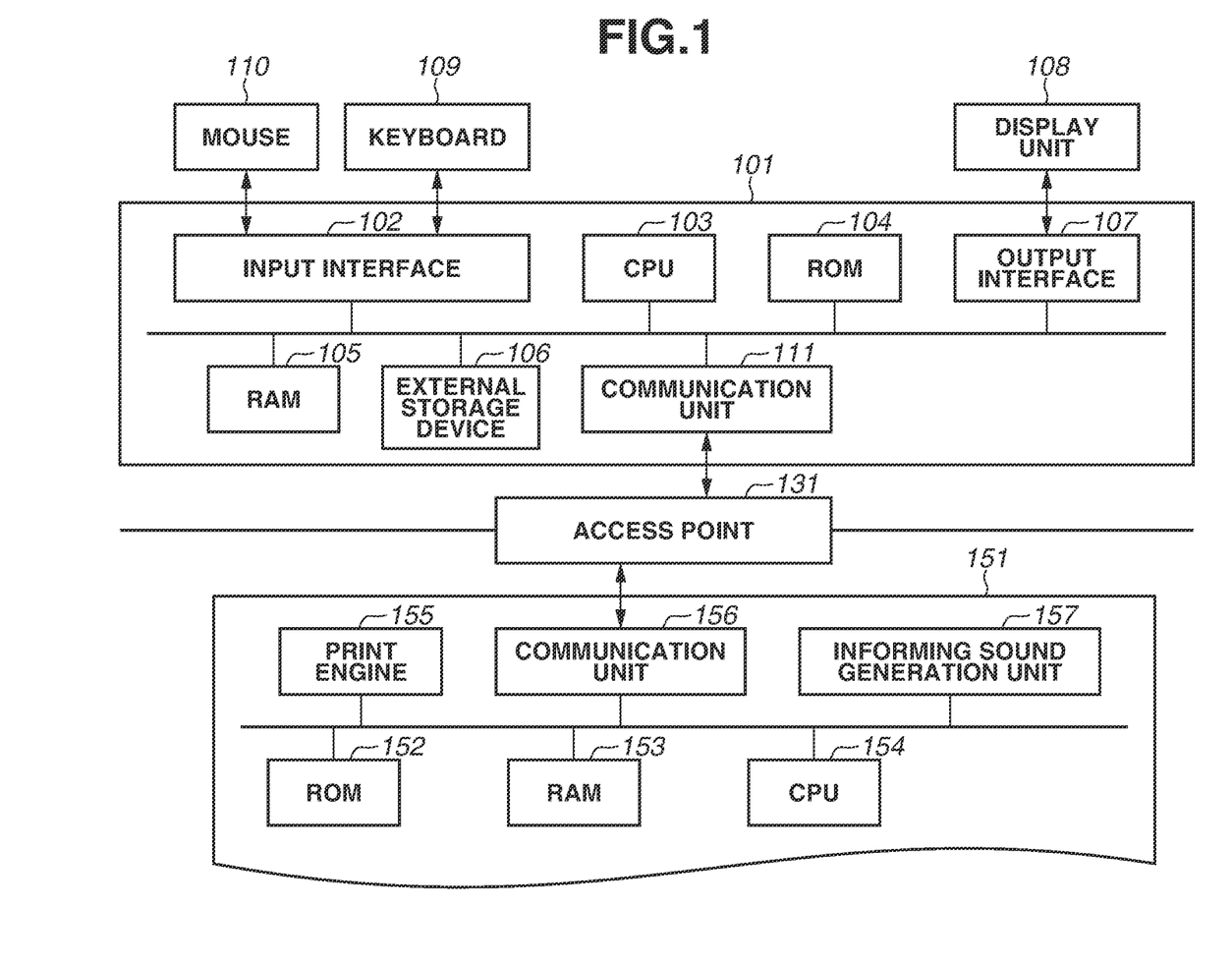
FIG. 1 is a diagram illustrating an example of a configuration of an information processing apparatus and an example of a configuration of a communication apparatus according to an exemplary embodiment of the present disclosure.

A configuration of the information processing apparatus according to the present exemplary embodiment and the communication apparatus capable of communication with the information processing apparatus according to the present exemplary embodiment will initially be described with reference to the block diagram of FIG. 1. While the present exemplary embodiment is described by using the following configuration as an example, the present exemplary embodiment is applicable to an apparatus that can communicate with a communication apparatus, and the functions are not particularly limited to those illustrated in the diagram.

An information processing apparatus 101 is the information processing apparatus according to the present exemplary embodiment. The information processing apparatus 101 includes an input interface 102, a central processing unit (CPU) 103, a read-only memory (ROM) 104, a random access memory (RAM) 105, an external storage device 106, an output interface 107, a display unit 108, and a communication unit 111.

The input interface 102 is an interface for receiving data input and operation instructions from a user through operation of a mouse 110 and a keyboard 109.

The CPU 103 is a system control unit and controls the entire information processing apparatus 101.

The ROM 104 stores fixed data such as control programs to be executed by the CPU 103, data tables, and a built-in operating system (OS) program. In the present exemplary embodiment, the control programs stored in the ROM 104 perform software execution control such as scheduling, task switching, and interrupt processing under management of the built-in OS stored in the ROM 104.

The RAM 105 includes a static random access memory (SRAM) that uses a backup power supply. Since the RAM 105 stores data using a not-illustrated primary battery for data backup, important data such as program control variables can be stored in a nonvolatile manner. A memory area for storing setting information about the information processing apparatus 101 and management data on the information processing apparatus 101 is also located in the RAM 105. The RAM 105 is also used as a main memory and a work area of the CPU 103.

The external storage device 106 stores an application program (print application to be described below) for providing a print execution function, and a print information generation program for generating print information interpretable by a communication apparatus 151. The external storage device 106 also stores various programs including an information transmission and reception control program for performing transmission and reception of information with the communication apparatus 151 connected via the communication unit 111, and various types of information to be used by such programs.

The output interface 107 is an interface for controlling data display and notification of a state of the information processing apparatus 101 by the display unit 108.

The display unit 108 includes a light-emitting diode (LED) and a liquid crystal display (LCD), and displays data and issues a notification of the state of the information processing apparatus 101. Operation units such as numerical input keys, a mode setting key, an OK key, a cancel key, and a power key may be installed on the display unit 108 to accept the user's input via the display unit 108.

The communication unit 111 is configured to connect to apparatuses such as the communication apparatus 151 and an access point 131 and performing data communication. For example, the communication unit 111 can connect to an access point (not illustrated) in the communication apparatus 151. The connection between the communication unit 111 and the access point in the communication apparatus 151 enables mutual communication between the information processing apparatus 101 and the communication apparatus 151. The communication unit 111 may communicate directly with the communication apparatus 151 using wireless communication, or may communicate with the communication apparatus 151 via an external apparatus outside the information processing apparatus 101 and the communication apparatus 151. Examples of the external apparatus include an external access point (such as the access point 131) outside the information processing apparatus 101 and outside the communication apparatus 151, and an apparatus that can relay communication other than access points. Examples of the wireless communication method include Wireless Fidelity (Wi-Fi®) and Bluetooth®. Examples of the access point 131 include a device such as a wireless local area network (LAN) router. In the present exemplary embodiment, a method in which the information processing apparatus 101 and the communication apparatus 151 are directly connected to each other without the intervention of an external access point will be referred to as a direct connection method. A method in which the information processing apparatus 101 and the communication apparatus 151 are connected to each other via an external access point will be referred to as an infrastructure connection method.

The communication apparatus 151 is the communication apparatus according to the present exemplary embodiment. The communication apparatus 151 includes a ROM 152, a RAM 153, a CPU 154, a print engine 155, a communication unit 156, and an informing sound generation unit 157.

The communication unit 156 includes an access point for establishing connection with an apparatus such as the information processing apparatus 101 as an internal access point of the communication apparatus 151. This access point can connect to the communication unit 111 of the information processing apparatus 101. The communication unit 156 may communicate directly with the information processing apparatus 101 using wireless communication, or communicate via the access point 131. Examples of the communication method include Wi-Fi®. The communication unit 156 may include hardware functioning as an access point, or operate as an access point by using software for providing an access point function.

The informing sound generation unit 157 is configured to inform a state and a function execution result of the communication apparatus 151 by generating sound.

The RAM 153 includes an SRAM that uses a backup power supply. Since the RAM 153 stores data by using a not-illustrated primary battery for data backup, important data such as program control variables can be stored in a nonvolatile manner. A memory area for storing setting information about the communication apparatus 151 and management data on the communication apparatus 151 is also located in the RAM 153. The RAM 153 is also used as a main memory and a work memory of the CPU 154, serves as a reception buffer for temporarily storing print information received from the information processing apparatus 101 and stores various types of information.

The ROM 152 stores fixed data such as control programs to be executed by the CPU 154, data tables, and an OS program. In the present exemplary embodiment, the control programs stored in the ROM 152 perform software execution control such as scheduling, task switching, and interrupt processing under management of the built-in OS stored in the ROM 152.

The CPU 154 is a system control unit and controls the entire communication apparatus 151.

The print engine 155 forms an image on a recording medium, such as paper, by applying a recording agent, such as ink, to the recording medium based on information stored in the RAM 153 and a print job received from the information processing apparatus 101, and outputs the print result.

A memory, such as an external hard disk drive (HDD) and a Secure Digital (SD) card, may be attached to the communication apparatus 151 as an optional device. The information to be stored in the communication apparatus 151 may be stored in the memory.

A communication mode of the communication apparatus 151 according to the present exemplary embodiment is set by connection setting processing to be described below. The communication apparatus 151 communicates with the information processing apparatus 101 using a connection configuration based on the set connection mode. In a case of performing communication by infrastructure connection, an infrastructure connection mode is set as the connection mode of the communication apparatus 151 according to the present exemplary embodiment. In case of performing communication by direct connection, a direct connection mode is set as the connection mode.

Direct Connection Method

Direct connection refers to a configuration where the apparatuses are wirelessly connected to each other directly (i.e., in a peer-to-peer manner) without the intervention of an external apparatus such as the access point 131. As one of connection modes, the communication apparatus 151 can operate in a mode for performing communication by direct connection (direct connection mode). In WiFi® communication, there is a plurality of modes for performing communication by direct connection, including a software access point (AP) mode and a Wi-Fi Direct® (WFD) mode.

The WFD mode refers to a mode in which direct connection is implemented by WFD. WFD is a standard developed by the Wi-Fi Alliance, and is a standard included in the Institute of Electrical and Electronics Engineers (IEEE) 802.11 series communication standards (WiFi® communication standards). In the WFD mode, a device to be a communication partner is searched for in response to a device search command, and then peer-to-peer (P2P) group owner (GO) and P2P client roles are determined and the rest of the wireless connection processing is performed. The GO corresponds to a WiFi® master station (parent station), and the client corresponds to a Wi-Fi® slave station (child station). The role determination corresponds to P2P GO Negotiation, for example. In the WFD mode before the role determination, the communication apparatus 151 is neither a master station nor a slave station. Specifically, one of devices to communicate each other initially issues a device search command and searches for a device to connect to in the WFD mode. If the other device to be the communication partner is found, the two devices check each other's information about services and functions that can be provided by the devices. This device provision information check is optional and not essential. Such a device provision information check phase corresponds to P2P Provision Discovery, for example. Next, which device plays the role of a P2P client and which device plays the role of a P2P GO are determined by checking each other's device provision information. Next, after the client and GO are determined, the two devices exchange parameters for performing WFD communication. Based on the exchanged parameters, the P2P client and GO perform the rest of the wireless connection processing and Internet Protocol (IP) connection processing therebetween. In the WFD mode, the communication apparatus 151 may always operate as a GO without performing the foregoing GO Negotiation. In other words, the communication apparatus 151 may operate in a WFD mode that is an Autonomous GO mode.

Examples of the state where the communication apparatus 151 operates in the WFD mode include a case where a WFD connection is not established and the communication apparatus 151 is operating as a GO, and a case where a WFD connection is established and the communication apparatus 151 is operating as a GO.

In the software AP mode, one (for example, the information processing apparatus 101) of the devices to communicate (for example, the information processing apparatus 101 and the communication apparatus 151) serves as a client that plays the role of requesting various services. The other device implements a Wi-Fi® AP function by software settings. The software AP corresponds to a Wi-Fi® master station, and the client corresponds to a Wi-Fi® slave station. In the software AP mode, the client searches for a device to be the software AP by using a device search command. If the software AP is found, the client and the software AP performs the rest of the wireless connection processing (establish a wireless connection), and then perform IP connection processing (allocate IP addresses). In a case of establishing the wireless connection between the client and the software AP, commands and parameters defined by the Wi-Fi® standard can be transmitted and received therebetween. A description thereof will be omitted here.

In the present exemplary embodiment, if the communication apparatus 151 establishes and maintains a direct connection, the communication apparatus 151 operates as a master station in the network to which the communication apparatus 151 belongs to. The master station refers to a device that constructs a wireless network and provides a slave station with parameters for use in connecting to the wireless network. Examples of the parameters for use in connecting to the wireless network include a parameter about the channel the master station uses. The slave station receives the parameter and connects to the wireless network constructed by the master station, using the channel that the master station uses.

Infrastructure Connection Method

Infrastructure connection is a connection configuration where the devices to communicate (for example, the information processing apparatus 101 and the communication apparatus 151) connect to an AP (for example, the AP 131) governing the network of the devices and communicate with each other via the AP. As one of connection modes, the communication apparatus 151 can operate in a mode for performing communication by infrastructure connection (infrastructure connection mode). In the present exemplary embodiment, the infrastructure connection is implemented by the IEEE 802.11 series communication standards.

In the infrastructure connection, each device searches for the AP by using a device search command. If the AP is found, the device and the AP performs the rest of the wireless connection processing (establish a wireless connection) and then perform IP connection processing (allocate IP addresses). In a case of establishing the wireless connection between the device and the AP, commands and parameters defined by the IEEE 802.11 series communication standards can be transmitted and received therebetween. A description thereof will be omitted here.

In the present exemplary embodiment, if the communication apparatus 151 operates in the infrastructure connection mode, the AP 131 operates as a master station and the communication apparatus 151 a slave station. In other words, in the present exemplary embodiment, the infrastructure connection refers to a connection between the communication apparatus 151 operating as a slave station and a device operating as a master station. In a case where the communication apparatus 151 establishes the infrastructure connection and the information processing apparatus 101 also establishes an infrastructure connection with the AP 131, the communication apparatus 151 and the information processing apparatus 101 can communicate with each other via the AP 131. Since the channel to be used for communication in the infrastructure connection is determined by the AP 131, the communication apparatus 151 performs communication in the infrastructure connection using the channel determined by the AP 131. In the present exemplary embodiment, the communication apparatus 151 can use channels corresponding to the 2.4-GHz frequency band and channels corresponding to the 5-GHz frequency band for communication in the infrastructure connection. The communication apparatus 151 can also use channels corresponding to the dynamic frequency selection (DFS) band in the 5-GHz frequency band. To communicate with the communication apparatus 151 via the AP 131, the information processing apparatus 101 recognizes that the communication apparatus 151 belongs to the network that is formed by the AP 131 and to which the information processing apparatus 101 belongs.

In the present exemplary embodiment, the communication apparatus 151 can establish a direct connection and an infrastructure connection in parallel. In other words, the communication apparatus 151 can establish a Wi-Fi® connection where the communication apparatus 151 serves as a slave station and a Wi-Fi® connection where the communication apparatus 151 serves as a master station in parallel. Operation in the state where the foregoing two connections are established in parallel will be referred to as simultaneous operation.

Connection Setting Processing

In the present exemplary embodiment, the information processing apparatus 101 performs connection setting (network setting) that is setting for operating the communication apparatus 151 in at least either one of the infrastructure and direct connections by using wireless communication with the communication apparatus 151. The connection setting processing according to the present exemplary embodiment is also referred to as cableless setup (CLS) since the processing is executed by wireless communication. The connection setting processing can also be executed by wired communication.

Figure 2:
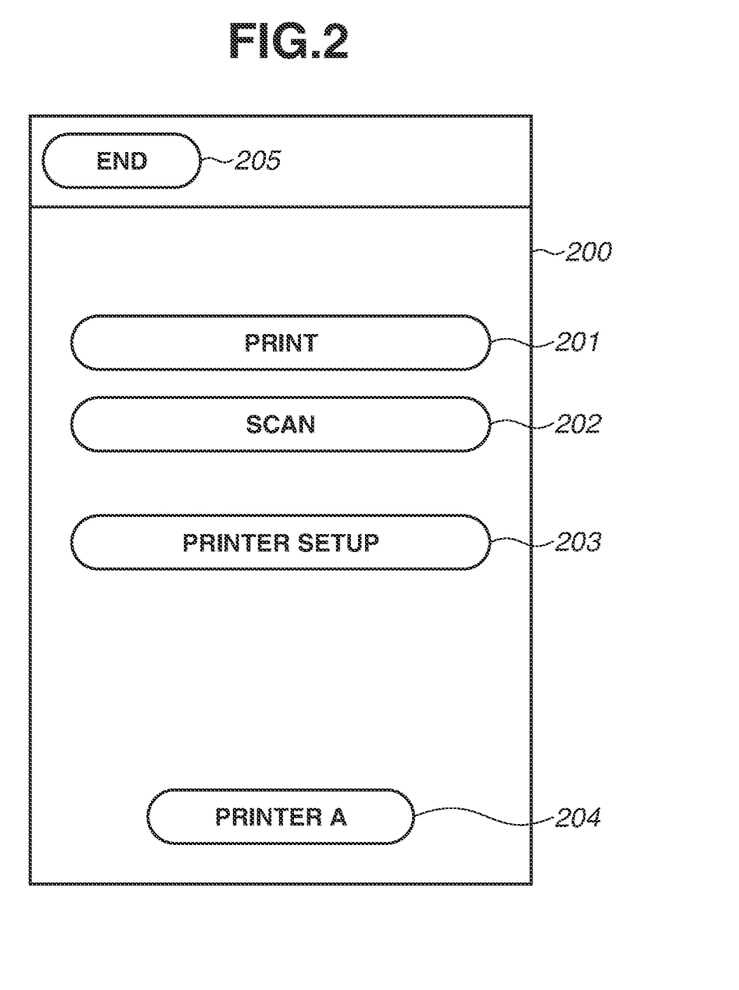
FIG. 2 is a diagram illustrating an example of a screen in activating a print application.

The information processing apparatus 101 performs the connection setting processing with the communication apparatus 151 when a predetermined application stored in the ROM 104 or the external storage device 106 is running. The predetermined application is an application for setting an AP to which the communication apparatus 151 is to connect and causing the communication apparatus 151 to print image data or document data in the information processing apparatus 101, and the predetermined application will hereinafter be referred to as a print application. The print application may have other functions than the function of setting the AP to which the communication apparatus 151 is to connect or the print function. For example, if the communication apparatus 151 has a scan function, the print application may have the functions of causing the communication apparatus 151 to scan a loaded document, making other settings of the communication apparatus 151, and checking the state of the communication apparatus 151. FIG. 2 illustrates an example of a screen displayed on the display unit 108 upon activation of the print application. The user can use the functions of the communication apparatus 151, including the function of printing a desired image and the function of setting the communication apparatus 151, via a startup screen 200. If a print button 201 is detected to be pressed, the information processing apparatus 101 performs processing for causing the communication apparatus 151 to perform printing. This processing includes processing for accepting selection of the image to be printed and processing for transmitting a print job for causing the communication apparatus 151 to perform printing. If a scan button 202 is detected to be pressed, the information processing apparatus 101 performs processing for causing the communication apparatus 151 to perform a scan. This processing includes processing for transmitting a scan job for causing the communication apparatus 151 to perform a scan and processing for receiving an image obtained by the scan performed based on the scan job. If a printer setup button 203 is detected to be pressed, the information processing apparatus 101 starts the connection setting processing.

The communication apparatus 151 can operate in a connection setting mode (connection setting state) that is a mode for executing the connection setting processing. The communication apparatus 151 executes the connection setting processing in the state of operating in the connection setting mode. Details of the connection setting mode will be described below.

In a case of operating the communication apparatus 151 in the infrastructure connection mode, the information processing apparatus 101 wirelessly transmits infrastructure setting information that is setting information for causing the communication apparatus 151 to operate in the infrastructure connection mode to the communication apparatus 151. The infrastructure setting information includes information about the AP 131. Examples of the information about the AP 131 include information about a service set identifier (SSID), a password, and a frequency band.

On the other hand, in a case of operating the communication apparatus 151 in the direct connection mode, the information processing apparatus 101 wirelessly transmits direct setting information that is setting information for causing the communication apparatus 151 to operate in the direction connection mode to the communication apparatus 151. The direct setting information includes instructions to enable the WFD function and cause the communication apparatus 151 to operate as a GO, or enable the AP setting of the communication apparatus 151. The information processing apparatus 101 also obtains connection information for establishing a direct connection with the communication apparatus 151 from the communication apparatus 151. Examples of the connection information for establishing a direction connection with the communication apparatus 151 include information about the SSID and password of the communication apparatus 151.

In the present exemplary embodiment, a direct connection intended for connection setting between the information processing apparatus 101 and the communication apparatus 151 is used to transmit the infrastructure setting information and the direct setting information and obtain the information for establishing the direct connection with the communication apparatus 151 in the connection setting processing. In the present exemplary embodiment, the connection setting processing using Wi-Fi® is executed for the direct connection intended for connection setting. However, other wireless communication standards besides Wi-Fi®, such as Bluetooth®, may be used. Wired communication standards such as a wired LAN and Universal Serial Bus (USB) may be used.

After the Wi-Fi® infrastructure connection or the direct connection is established between the information processing apparatus 101 and the communication apparatus 151 by the connection setting processing, the information processing apparatus 101 and the communication apparatus 151 can communicate with each other via the established connection. Specifically, for example, the information processing apparatus 101 can transmit a print job for causing the communication apparatus 151 to perform printing and a scan job for causing the communication apparatus 151 to perform a scan to the communication apparatus 151 via the established connection.

In the present exemplary embodiment, the communication apparatus 151 can be operated in either of the infrastructure connection mode and the direct connection mode by the connection setting processing. However, such a configuration is not restrictive. For example, the control setting processing may be configured to operate the communication apparatus 151 only in the infrastructure connection mode (i.e., configured to not operate the communication apparatus 151 in the direct connection mode).

Connection Setting Mode

As described above, the communication apparatus 151 can operate in the connection setting mode. The trigger for the communication apparatus 151 to start operation in the connection setting mode can be, for example, the pressing of a connection setting mode button by the user or the activation of the communication apparatus 151 (transition to a software ON state). The connection setting mode button may be a hardware button provided on the communication apparatus 151 or a software button displayed on the display unit 108. The communication apparatus 151 enables Wi-Fi® communication when starting operation in the connection setting mode. Specifically, the communication apparatus 151 operates as an AP dedicated to the connection setting mode. The communication apparatus 151 thereby becomes able to establish a Wi-Fi® direct connection with the information processing apparatus 101. Connection information (such as an SSID) for connecting to the AP dedicated to the connection setting mode is stored in advance in a setup program for the communication apparatus 151, which has been installed on the information processing apparatus 101. The information processing apparatus 101 recognizes in advance the connection information for connecting to the software AP dedicated to the connection setting mode. Unlike the connection information about the AP that is enabled in the direct connection mode, at least part of the connection information for connecting to the software AP dedicated to the connection setting mode (at least part of the SSID) is therefore not freely changeable by the user. In the present exemplary embodiment, there is no password for connecting to the software AP dedicated to the connection setting mode, and the information processing apparatus 101 can connect to the communication apparatus 151 operating in the connection setting mode without a password as long as the information processing apparatus 101 recognizes the SSID. However, such a configuration is not restrictive. For example, the setup program for the communication apparatus 151 may also store a password for connecting to the software AP dedicated to the connection setting mode in advance, and the connection with the communication apparatus 151 operating in the connection setting mode may be established using the password.

In the connection setting mode, the communication apparatus 151 may be connected to the information processing apparatus 101 not by ordinary Wi-Fi® but by WFD. More specifically, the communication apparatus 151 may operate as a GO and receive the setting information from the information processing apparatus 101 by communication through the WFD connection. Alternatively, in the connection setting mode, the communication apparatus 151 may be connected to the information processing apparatus 101 by Bluetooth®. More specifically, the communication apparatus 151 may operate as a slave device in a Bluetooth® connection and receive the setting information from the information processing apparatus 101 by Bluetooth® communication (communication via the Bluetooth® connection). The Bluetooth® may be Bluetooth® Classic or Bluetooth® Low Energy. If Bluetooth® Low Energy is used, the communication apparatus 151, upon starting to operate in the connection setting mode, starts transmitting advertisement information based on the Bluetooth® Low Energy standard and enters a state where a Bluetooth® Low Energy connection can be established with the information processing apparatus 101 receiving the advertisement information. Alternatively, Wi-Fi® and Bluetooth® both may be usable in the connection setting mode. More specifically, if a connection request is received from the information processing apparatus 101 by Wi-Fi®, the communication apparatus 151 operating in the connection setting mode may receive the setting information via the Wi-Fi® connection. If a connection request is received from the information processing apparatus 101 by Bluetooth®, the communication apparatus 151 operating in the setting mode may receive the setting information via the Bluetooth® connection.

While the foregoing process sharing between the information processing apparatus 101 and the communication apparatus 151 has been described as an example, such a sharing mode is not particularly restrictive and other modes may be employed.

STA/STA Function

Some Wi-Fi® compatible terminals that can perform the connection setting processing by executing the print application may be capable of Wi-Fi® station/station (STA/STA) Concurrency function (hereinafter, STA/STA function). The STA/STA function is a function introduced at Android 12, and enables a Wi-Fi® compatible terminal to simultaneously establish (in parallel) a plurality of Wi-Fi® network connections where the terminal operates and functions as a slave unit. Here, the slave unit refers to a station (STA). In other words, the STA/STA function is a function by which the Wi-Fi® compatible terminal can simultaneously maintain connections with a plurality of APs. To use the STA/STA function, not only the OS version but also the hardware of the information processing apparatus 101 where the OS is installed need to support the STA/STA function. Even if a Wi-Fi® compatible terminal simultaneously establishes connections with a plurality of Wi-Fi® networks by the STA/STA function, the Wi-Fi® compatible terminal cannot simultaneously communicate with the plurality of networks as communication of a single application. In other words, in the state where a Wi-Fi® compatible terminal simultaneously establishes connections with a plurality of Wi-Fi® networks by the STA/STA function, the Wi-Fi® compatible terminal operates in a state where one of the Wi-Fi® networks can be used for communication of a single application but not the other of the Wi-Fi® networks. That is, the state where a Wi-Fi® compatible terminal simultaneously establishes connections with a plurality of Wi-Fi® networks corresponds to where the Wi-Fi® compatible terminal simultaneously belongs to the plurality of Wi-Fi® networks.

A network formed by the communication apparatus 151 operating in the connection setting mode is a network not connected to the Internet. A network not connected to the Internet will hereinafter be referred to as a local network. In other words, the information processing apparatus 101 is unable to perform Internet communication via a local network.

With a plurality of Wi-Fi® networks simultaneously established by the STA/STA function, which one of the networks to use for communication of an application is determined by the OS. The network that the OS determines to use for communication of an application in the state where a plurality of Wi-Fi® networks is simultaneously established by the STA/STA function will be referred to as a primary network. Without an instruction about a primary network setting received from an application, the OS sets an Internet-connected network among the plurality of networks as the primary network for the application with priority over one(s) not connected to the Internet. In other words, a default primary network set by the OS is an Internet-connected network. The network formed by the communication apparatus 151 operating in the connection setting mode is therefore not set as the primary network for the print application in a state where a plurality of Wi-Fi® networks is simultaneously established by the STA/STA function and no instruction about the primary network setting is received from the print application. That is, in the state where a plurality of Wi-Fi® networks is simultaneously established by the STA/STA function, there is an issue that communication cannot be executed by the print application via the network formed by the communication apparatus 151 operating in the connection setting mode.

In view of this, in the present exemplary embodiment, the Wi-Fi® network to be used for communication in the state where the Wi-Fi® compatible terminal simultaneously establishes a plurality of Wi-Fi® networks by the STA/STA function is appropriately controlled.

The primary network setting about the print application is applied only to the print application. Other applications of the information processing apparatus 101 execute communication based on the primary network settings about the respective applications or the default primary network setting made by the OS. If, for example, a first network is set as the primary network for the print application, the print application can use only the first network for communication. Meanwhile, another application can use a second network for communication if the second network is set as the primary network for another application or if no primary network for another application is set by instructions from another application and the default primary network set by the OS is the second network. However, such a configuration is not restrictive. The primary network set by the print application may be applied to all the applications of the information processing apparatus 101.

In the present exemplary embodiment, the number of networks that can be simultaneously maintained connected by the STA/STA function is two. Possible combinations of networks that can be simultaneously maintained connected by the STA/STA function are a local network and a local network, and a local network and an Internet-connected network. In other words, a combination of an Internet-connected network and an Internet-connected network cannot be simultaneously maintained connected by the STA/STA function. However, such a configuration is not restrictive. The number of networks that can be simultaneously maintained connected by the STA/STA function may be two or more. A combination of an Internet-connected network and an Internet-connected network may be simultaneously maintained.

Figure 3:
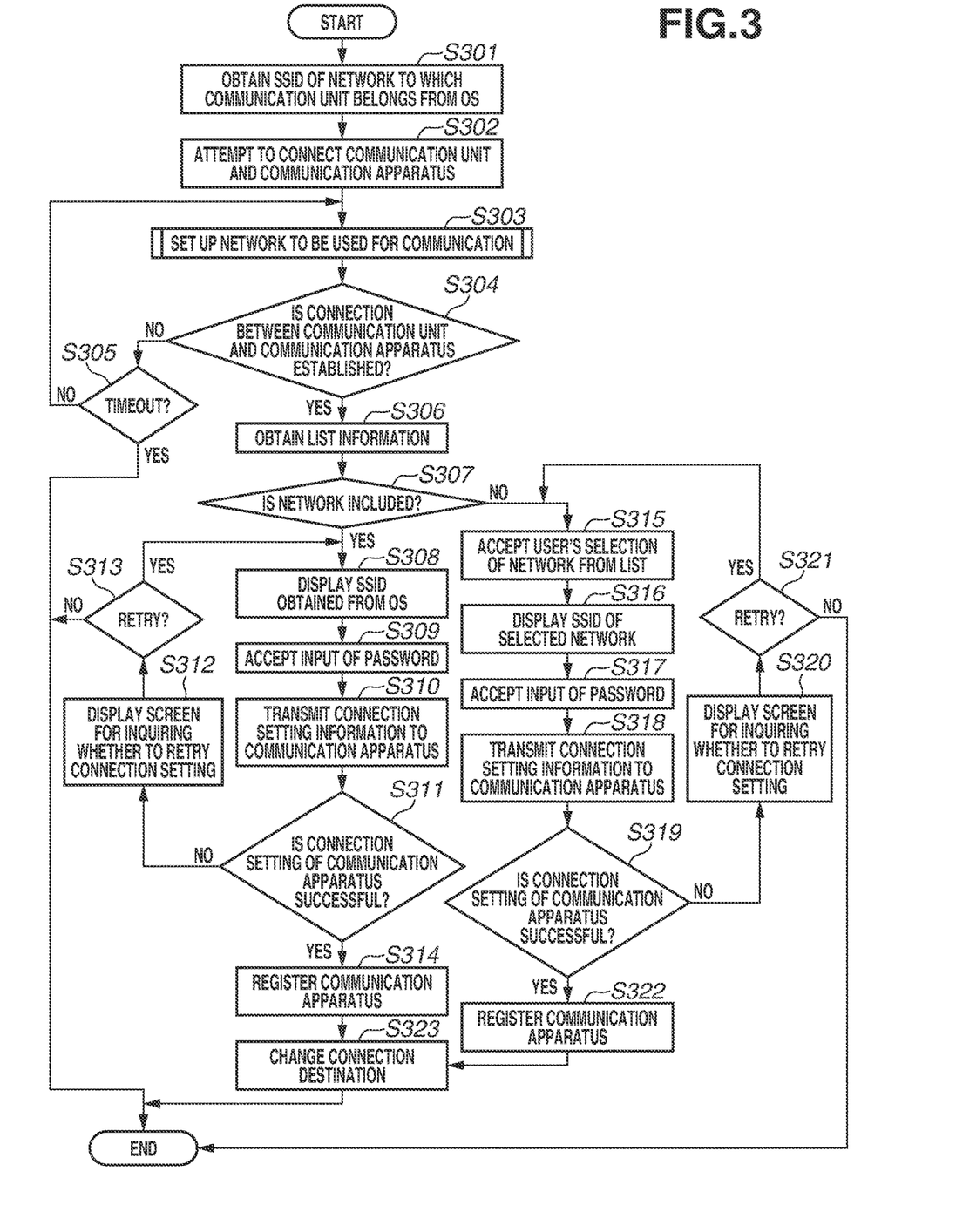
FIG. 3 is a flowchart illustrating connection setting processing performed by the information processing apparatus.

FIG. 3 is a flowchart illustrating a flow of the connection setting processing performed by the information processing apparatus 101.

The flowchart illustrated in FIG. 3 is implemented, for example, by the CPU 103 reading a program stored in the ROM 104 or the external storage device 106 into the RAM 105 and executing the program. Specifically, for example, the flowchart illustrated in FIG. 3 is implemented by the print application. The processing illustrated in the flowchart of FIG. 3 is started when the printer setup button 203 is pressed. Suppose here that the communication apparatus 151 has already entered the connection setting mode.

In step S301, the CPU 103 initially detects that the instruction to execute the connection setting processing is given by the user. The CPU 103 then obtains the SSID of a network to which the communication unit 111 belongs (joins) and that is formed by the AP 131 to which communication unit 111 is connected from the OS installed on the information processing apparatus 101. Information about the network to which the communication unit 111 belongs refers to information about the AP 131 to which the communication unit 111 is connected. The OS has obtained the information about the network to which the communication unit 111 belongs from the AP 131 in advance before the communication is started. For example, the information about the network to which the communication unit 111 belongs may be obtained from a beacon of the Wi-Fi® standard issued by the AP 131. The CPU 103 may obtain the information by inquiring of the AP 131 after the beacon is acquired and a Wi-Fi® connection is established. The configuration of obtaining the information about the network to which the communication unit 111 belongs is not limited to the configuration in which the information is obtained from the OS. For example, the CPU 103 may obtain the information by inquiring of the AP 131 in step S301. If the communication unit 111 is not connected to any AP, this processing is omitted.

In step S302, the CPU 103 attempts to connect the communication unit 111 and the communication apparatus 151 that is the target of the connection setting processing. For example, some communication apparatuses can perform the connection setting processing via Wi-Fi®. If such a communication apparatus is in the connection setting mode, an internal AP configured to be active only during the connection setting mode is enabled, for example. The CPU 103 can discover the communication apparatus in the connection setting mode by detecting a beacon that the internal AP transmits according to the Wi-Fi® standard, and connect to the communication apparatus and the communication unit 111. In the present exemplary embodiment, the connection between the communication apparatus 151 and the communication unit 111 corresponds to the connection between the internal AP of the communication apparatus 151 and the communication unit 111. If the information processing apparatus 101 supports the STA/STA function and is in connection with the AP 131, the CPU 103 attempts to connect the information processing apparatus 101 and the communication apparatus 151 while maintaining the connection between the information processing apparatus 101 and the AP 131. If the information processing apparatus 101 does not support the STA/STA function and is in connection with the AP 131, the CPU 103 disconnects the connection between the information processing apparatus 101 and the AP 131 and attempts to connect the information processing apparatus 101 and the communication apparatus 151.

In step S303, the CPU 103 sets up the network to be used for communication. Details of the processing of step S303 will now be described with reference to FIG. 4.

Figure 4:
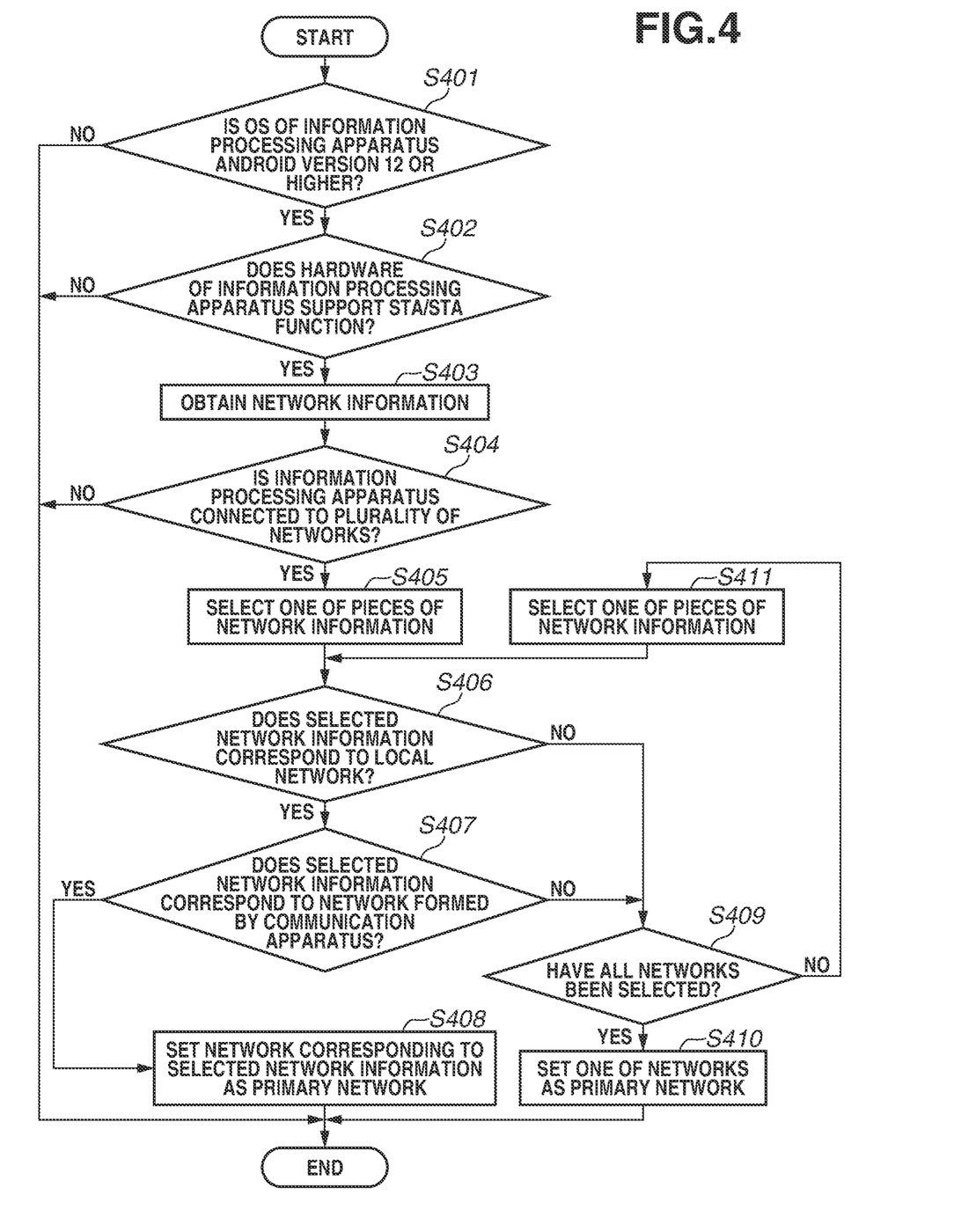
FIG. 4 is a flowchart illustrating setting processing related to a network to be used for communication.

FIG. 4 is a flowchart illustrating a procedure for the processing of step S303.

In step S401, the CPU 103 determines whether the OS of the information processing apparatus 101 is Android™. If the OS of the information processing apparatus 101 is determined to be Android™, the CPU 103 determines whether the version of the OS of the information processing apparatus 101 is 12 or higher. If the print application to make this determination is an Android-dedicated one, the determination of whether the OS of the information processing apparatus 101 is Android™ may be omitted. If the OS of the information processing apparatus 101 is Android™ and the version of the OS of the information processing apparatus 101 is 12 or higher (YES in step S401), the processing proceeds to step S402. If the OS of the information processing apparatus 101 is not Android™ (NO in step S401), the processing ends.

In step S402, the CPU 103 determines whether the hardware of the information processing apparatus 101 supports the STA/STA function. If the hardware of the information processing apparatus 101 supports the STA/STA function (YES in step S402), the processing proceeds to step S403. If the hardware of the information processing apparatus 101 does not support the STA/STA function (NO in step S402), the processing ends.

In the present exemplary embodiment, the determinations of steps S401 and S402 are separately made, whereas the determinations may be simultaneously made in a single determination process.

In step S403, the CPU 103 obtains network information about all networks to which the information processing apparatus 101 is connected. The network information includes an IP address, SSID, and media access control (MAC) address of a AP that forms the network and to which the information processing apparatus 101 is connected. If the information processing apparatus 101 is connected to a plurality of networks, a plurality of pieces of network information corresponding to the respective networks is obtained.

In step S404, the CPU 103 determines whether the information processing apparatus 101 is connected to a plurality of networks, based on the network information obtained in step S403. If the information processing apparatus 101 is connected to a plurality of networks (YES in step S404), the processing proceeds to step S405. If the information processing apparatus 101 is connected to only one network (NO in step S404), the processing ends. The case where the information processing apparatus 101 is connected to a plurality of networks corresponds to a case where the information processing apparatus 101 maintains the connection with the communication apparatus 151 operating in the connection setting mode and a connection with another AP. The case where the information processing apparatus 101 is connected to only one network corresponds to a case where the information processing apparatus 101 maintains only the connection with the communication apparatus 151 operating in the connection setting mode.

In step S405, the CPU 103 selects (specifies) one of the pieces of network information obtained. Here, the CPU 103 may preferentially select the network information corresponding to the network currently set as the primary network. Alternatively, the CPU 103 may preferentially select network information obtained first, or preferentially select network information corresponding to the network established first.

In step S406, the CPU 103 determines whether the selected network information corresponds to a local network. As described above, the network formed by the communication apparatus 151 operating in the connection setting mode is a local network. A network formed by an AP outside the communication apparatus 151 is also determined to be a local network if the network is not connected to the Internet. This determination can be implemented by using an application programming interface (API) provided for Android™ developers, for example. If the selected network information is determined to correspond to a local network (YES in step S406), the processing proceeds to step S407. If the selected network information is determined to not correspond to a local network (NO in step S406), the processing proceeds to step S409.

In step S407, the CPU 103 determines whether the selected network information corresponds to the network formed by the communication apparatus 151 operating in the connection setting mode. Specifically, for example, the CPU 103 determines whether the IP address included in the selected network information matches predetermined information corresponding to the network formed by the communication apparatus 151 operating in the connection setting mode. Examples of the predetermined information include an IP address, an SSID, and a MAC address. The predetermined information is not obtained from the communication apparatus 151 but stored by the print application in advance. In the present exemplary embodiment, an IP address is used as the predetermined information. In such a case, the communication apparatus 151 operating in the connection setting mode sets a fixed IP address that is the same as that stored by the print application and not freely changeable by the user as the IP address of the network that the communication apparatus 151 forms.

If the selected network information corresponds to the network formed by the communication apparatus 151 operating in the connection setting mode (YES in step S407), the processing proceeds to step S408. If the selected network information does not correspond to the network formed by the communication apparatus 151 operating in the connection setting mode (NO in step S407), the processing proceeds to step S409.

In the case where the selected network information corresponds to the network formed by the communication apparatus 151 operating in the connection setting mode, the determination of step S406 does not need to be made. However, the determination of step S406 can be completed before the determination of step S407. The presence of the determination of step S406 can thus expedite the processing in the case where the selected network information does not correspond to a local network. For such a reason, the determination of step S406 and the determination of step S407 are both made in the present exemplary embodiment. However, such a configuration is not restrictive. The determination of step S406 may be omitted to make the determination of step S407 after step S405 or step S411. In step S408, the CPU 103 performs processing for setting the network formed by the communication apparatus 151 operating in the connection setting mode as the primary network for the print application. In other words, the CPU 103 operates the information processing apparatus 101 in a state where the network that corresponds to the selected network information, i.e., the network formed by the communication apparatus 151 operating in the connection setting mode, is used for communication by the print application and other networks are not used. This processing is performed while the plurality of Wi-Fi® networks simultaneously established by the STA/STA function is maintained. Specifically, in this processing, for example, the CPU 103 instructs the OS to set the network formed by the communication apparatus 151 operating in the connection setting mode as the primary network, using the print application. For example, the CPU 103 may set the network formed by the communication apparatus 151 operating in the connection setting mode as the primary network for the print application by instructing the OS to bind the network currently set as the primary network for the print application by the OS, using the print application. The processing of this flowchart then ends, and the processing proceeds to step S304.

In step S409, the CPU 103 determines whether all the plurality of networks corresponding to the plurality of pieces of network information obtained have been selected in step S405 or step S411. If all the plurality of networks have been selected (YES in step S409), the processing proceeds to step S410. If not all the plurality of networks have been selected (NO in step S409), the processing proceeds to step S411.

In step S410, the CPU 103 performs processing for setting one of the networks corresponding to the plurality of pieces of network information obtained, as the primary network. Examples of the case where the processing proceeds to step S410 is a case where the connection attempted in step S302 fails and no connection is established between the communication apparatus 151 and the communication unit 111. Specifically, in this processing, for example, the CPU 103 instructs the OS to set one of the networks as the primary network, using the print application. The network to be set as the primary network in this processing may be any one of the networks corresponding to the plurality of pieces of network information obtained or a network specified based on some type of priority. This processing may be omitted to maintain the current primary network setting without a change. The processing of this flowchart then ends, and the processing proceeds to step S304. Alternatively, after the end of the processing of this flowchart, the processing of the flowchart of FIG. 3 may also be ended to abort the connection setting processing. In such a case, the CPU 103 may notify the user of the failure of communication with the communication apparatus 151 operating in the connection setting mode. The CPU 103 may issue a notification prompting the user to establish a connection between the communication apparatus 151 operating in the connection setting mode and the information processing apparatus 101.

In step S411, the CPU 103 selects a network not having been selected in step S405 or step S411 among the plurality of networks corresponding to the plurality of pieces of network information obtained. The CPU 103 then performs the processing of step S406 and the subsequent steps based on the selection made in step S411.

In step S304, the CPU 103 determines whether the connection attempted between the communication unit 111 and the communication apparatus 151 in step S302 has been established. The connection between the communication unit 111 and the communication apparatus 151 corresponds to the connection between the communication unit 111 and the internal AP of the communication apparatus 151. Specifically, in this processing, the CPU 103 obtains the SSID(s) of the network(s) to which the communication unit 111 belongs from the OS of the information processing apparatus 101, and determines whether a character string indicating the network formed by the internal AP of the communication apparatus 151 is included in the SSID(s).

If the connection between the communication unit 111 and the communication apparatus 151 is determined to have been established (YES in step S304), the processing proceeds to step S306. On the other hand, if the connection between the communication unit 111 and the communication apparatus 151 is determined to not have been established (NO in step S304), the processing proceeds to step S305. In step S305, the CPU 103 determines whether a predetermined time has elapsed since the start of the connection setting processing (whether timeout has occurred). If timeout is determined to not have occurred (NO in step S305), the processing returns to step S303. On the other hand, if timeout is determined to have occurred (YES in step S305), the processing ends. Here, the CPU 103 may display a screen for notifying the user of the timeout on the display unit 108.

In step S306, the CPU 103 requests the communication apparatus 151 list information about a list of networks discovered by the communication apparatus 151 through a search using the communication unit 156, through communication via the communication unit 111. The communication via the communication unit 111 is communication via the network formed by the communication apparatus 151 operating in the connection setting mode, or equivalently, communication via the direct connection between the communication apparatus 151 operating in the connection setting mode and the information processing apparatus 101. The list information is a list of pieces of identification information for identifying the networks discovered by the communication unit 156 through the search. Examples of the identification information include an SSID. The networks discovered here are ones formed by external APs, and are discovered by the communication apparatus 151 obtaining beacons issued from the external APs. The CPU 103 obtains list information transmitted from the communication apparatus 151 in response to the request, from the communication apparatus 151 by communication via the communication unit 111. The communication apparatus 151 may search for networks based on the reception of the request from the information processing apparatus 101, and generate the list information. Alternatively, the communication apparatus 151 may search for networks based on a trigger for the communication apparatus 151 to start operation in the connection setting mode, and generate the list information.

In step S307, the CPU 103 determines whether the network corresponding to the information obtained in step S301 is included in the list of networks obtained in step S306. If the network corresponding to the information obtained in step S301 is determined to be included (YES in step S307), the processing proceeds to step S308. If the network corresponding to the information obtained in step S301 is determined to not be included (NO in step S307), the processing proceeds to step S315.

Figure 5:
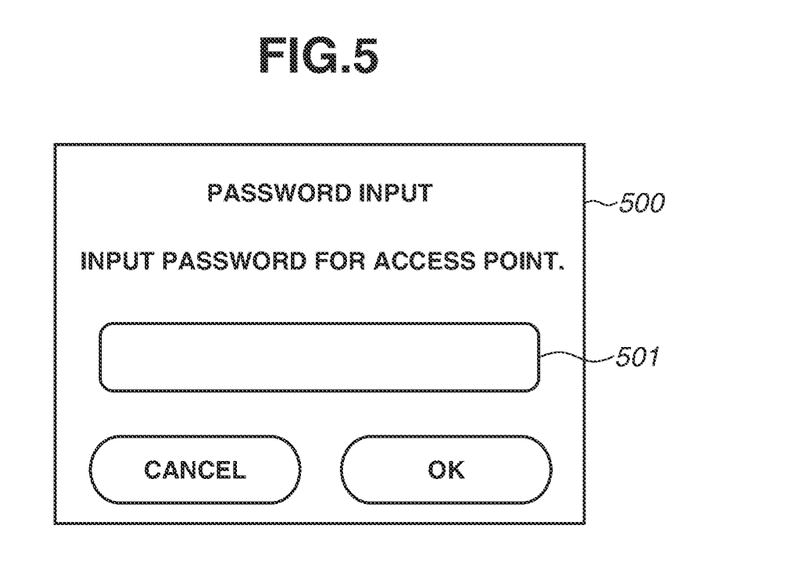
FIG. 5 is a diagram illustrating an example of a password input screen.

In step S308, the CPU 103 displays the SSID obtained from the OS in step S301, and displays an input screen for inputting a password to use the network corresponding to the SSID (here, network formed by the AP 131) on the display unit 108. Here, for example, a screen 500 illustrated in FIG. 5 is displayed as the password input screen. If the information processing apparatus 101 supports the STA/STA function, the information processing apparatus 101 has established both the connection with the AP 131 and the connection with the communication apparatus 151 here. The AP corresponding to the SSID displayed here is thus the AP to which the information processing apparatus 101 is currently connected.

In step S309, the CPU 103 accepts the input of the password for using the AP 131. The CPU 103 here obtains password information input to an input section 501 by the user.

In step S310, the CPU 103 transmits connection setting information for connecting the communication apparatus 151 to the network corresponding to the information obtained in step S301, to the communication apparatus 151 by communication via the network formed by the communication apparatus 151 operating in the connection setting mode. To put it another way, the connection setting information is information for connecting the communication apparatus 151 to the AP 131 and information about the AP 131. The connection setting information includes the SSID obtained in step S301, the password obtained in step S314, and a command for setting the connection mode of the communication apparatus 151. In the present exemplary embodiment, the command for setting the connection mode of the communication apparatus 151 is a command for setting the communication apparatus 151 to the infrastructure connection mode. Upon receiving the connection setting information, the communication apparatus 151 joins the network corresponding to the connection setting information and connects to the AP 131. In such a manner, the information processing apparatus 101 and the communication apparatus 151 connect to the same AP 131, whereby an infrastructure connection is established between the information processing apparatus 101 and the communication apparatus 151 to enable high speed communication via the wireless LAN. The information processing apparatus 101 and the communication apparatus 151 subsequently perform wireless LAN communication therebetween, for example, when the information processing apparatus 101 is instructed to perform print job transmission processing by the user.

In step S311, after the transmission of the connection setting information, the CPU 103 determines whether the connection setting of the communication apparatus 151 is successfully made using the connection setting information transmitted in step S310. Specifically, for example, the CPU 103 initially broadcasts information in order to receive a notification from the communication apparatus 151 on the network to which the information processing apparatus 101 is connected, and waits for receiving the notification from the communication apparatus 151. If the notification is received, the CPU 103 determines that the connection setting of the communication apparatus 151 is successful. If no notification is received, the CPU 103 determines that the connection setting of the communication apparatus 151 is not successful. However, such a method is not restrictive. For example, the communication apparatus 151 may transmit information about the success or failure of the connection setting to the information processing apparatus 101 by using Bluetooth®, and the information processing apparatus 101 may make the determination based on the information.

If the connection setting of the communication apparatus 151 is failed (NO in step S311), the processing proceeds to step S312. In step S312, the CPU 103 displays a screen for inquiring of the user whether to retry the connection setting of the communication apparatus 151 on the display unit 108. In step S313, the CPU 103 determines whether to retry the connection setting of the communication apparatus 151 based on the user's input to the screen. If the connection setting of the communication apparatus 151 is determined to be retried (YES in step S313), the processing returns to step S308 to perform the processing of step S308 and the subsequent steps again. If the connection setting of the communication apparatus 151 is determined to not be retried (NO in step S313), the processing ends. If the connection setting of the communication apparatus 151 is determined to be failed in step S311 (NO in step in step S311), the failure of the connection setting may be notified and the processing may be ended without performing the processing of steps S312 and S313.

If the connection setting of the communication apparatus 151 is successful (YES in step S311), the processing proceeds to step S314. In step S314, the CPU 103 registers the communication apparatus 151 as the communication destination of the information processing apparatus 101. Specifically, for example, the CPU 103 displays a screen (registration screen) for registering a communication apparatus as the communication destination of the information processing apparatus 101 on the display unit 108. The registration screen displays a list of communication apparatuses operating as APs and communication apparatuses connected to the APs to which the information processing apparatus 101 is connected, which are detected by performing a discovery process. For example, the discovery process includes a process of broadcasting information in order to receive a notification from the communication apparatus 151 on the network to which the information processing apparatus 101 is connected, and a process of discovering the communication apparatus 151 transmitting a notification in response to the broadcasting. If a communication apparatus is selected from the list displayed on the registration screen (list of registrable communication apparatuses), the selected communication apparatus is registered as the communication destination of the information processing apparatus 101. Alternatively, the communication apparatus 151 that is the target of the connection setting may be automatically registered as the communication destination of the information processing apparatus 101 without displaying the list of communication apparatuses and without a user input. The processing then proceeds to step S323.

In step S315, the CPU 103 displays a list of networks corresponding to the list information obtained from the communication apparatus 151 in step S306 on the display unit 108, and accepts the user's selection of a network from the list.

In step S316, the CPU 103 displays the SSID of the network selected in step S317, and displays an input screen for inputting a password for using the network corresponding to the SSID. For example, the screen 500 illustrated in FIG. 5 is displayed as the password input screen.

In step S317, the CPU 103 accepts the user's input of the password for using the network selected in step S315. Here, the CPU 103 obtains the password information input to the input section 501 by the user.

In step S318, the CPU 103 transmits the connection setting information for connecting the communication apparatus 151 to the network selected in step S315 to the communication apparatus 151 through communication.

The processing of steps S319 to S321 is similar to that of steps S311 to S313. After the determination of step S321, if the connection setting is to be retried, the processing may return to step S315 to perform the processing of step S315 and the subsequent steps again or may return to step S317 to perform the processing of step S317 and the subsequent steps again. The processing of step S322 is similar to that of step S314.

In step S323, the CPU 103 changes the connection destination of the communication unit 111 based on the completion of the communication for the connection setting. Specifically, the CPU 103 initially disconnects the connection between the communication unit 111 and the communication apparatus 151. If the STA/STA function is not supported and the communication unit 111 is not connected to another AP while the connection between the communication unit 111 and the communication apparatus 151 is established, the CPU 103 then establishes a new connection between the communication unit 111 and another AP. The AP for the communication unit 111 to be connected to here is the AP corresponding to the information obtained in step S301, for example. In step S323 that is performed after step S322, the AP for the communication unit 111 to be connected to may be the AP corresponding to the information selected in step S315, for example. The CPU 103 may change the connection destination of the communication unit 111 even if the STA/STA function is supported and the communication unit 111 is connected to another AP while the connection between the communication unit 111 and the communication apparatus 151 is established. For example, the CPU 103 may change the connection destination of the communication unit 111 from the AP corresponding to the information obtained in step S301 to the AP corresponding to the information selected in step S315. After the connection between the communication unit 111 and the communication apparatus 151 is disconnected, the CPU 103 may maintain the other connection.

In the foregoing exemplary embodiment, the processing for obtaining the information about the network to which the information processing apparatus 101 belongs from the OS is performed after the start of the communication with the communication apparatus 151. However, such a configuration is not restrictive. The processing for obtaining the information about the network to which the information processing apparatus 101 belongs from the OS may be performed before the start of the communication with the communication apparatus 151.

As described above, according to the present exemplary embodiment, a connection with a target communication apparatus can be determined and proper communication can be performed even if a plurality of communication paths is established using the same communication standard. This improves the usability since the communication is automatically switched without the user's manual operation of selecting the communication to be used.

Other Exemplary Embodiments

In the foregoing description, the STA/STA function is described to be supported by the Android™ OS. However, other OSes may support the STA/STA function. In such a case, in step S401, whether the OS of the information processing apparatus 101 is one supporting the STA/STA function is determined. In the foregoing description, whether to display the list of APs is switched depending on the determination result of step S307. However, such a configuration is not restrictive. The determination of step S307 may be omitted, and step S315 may be performed after step S306.

In the foregoing description, the determination of step S409 is performed if the determination result of step S406 or the determination result of step S407 is NO. However, such a configuration is not restrictive. If the determination result of step S406 or the determination result of step S407 is NO, a network corresponding to information not currently selected may be set as the primary network. The reason is that if the determination result of step S406 or the determination result of step S407 is NO, a network corresponding to information not currently selected is likely to be the network formed by the communication apparatus 151.

In the foregoing description, the network set as the primary network by the print application in the state where a plurality of Wi-Fi® networks is simultaneously established by the STA/STA function is described to be one used for the connection setting of the communication apparatus 151. Moreover, the setting of the primary network by the print application is described to be performed at timing when the connection setting processing by the print application is instructed to be performed by the user. However, such a configuration is not restrictive. The network set as the primary network by the print application in the state where a plurality of Wi-Fi® networks is simultaneously established by the STA/STA function may be any local network formed by the communication apparatus 151. In other words, the use purpose of the network set as the primary network by the print application is not limited in particular. For example, the network set as the primary network by the print application may be one used to transmit a print job or a scan job to the communication apparatus 151. The network set as the primary network by the print application may thus be a network formed by the communication apparatus 151 operating in the software AP mode or the WFD mode, for example, instead of the network formed by the communication apparatus 151 operating in the connection setting mode. Moreover, the trigger to execute the setting processing of the network to be used for the communication by the print application illustrated in FIG. 4 is not limited to the user's instruction for the print application to execute the connection setting processing. For example, the execution trigger may be the issuance of an instruction for the print application to transmit a print job by the user pressing the print button 201 or the issuance of an instruction for the print application to transmit a scan job by the user pressing the scan button 202.

In the foregoing description, the application that sets the primary network is described to be the print application. However, such a configuration is not restrictive. For example, the application that sets the primary network may be a scan application that transmits a scan job for causing a communication apparatus that is a scanner to perform a scan. Other examples include a camera application that transmits an imaging job for causing a communication apparatus that is a camera to capture an image, and a remote control application for remotely controlling a communication apparatus.

In the foregoing exemplary embodiment, the connection between the communication apparatus 151 operating in the connection setting mode and the information processing apparatus 101 is disconnected based on the completion of the connection setting. However, such a configuration is not restrictive, and the connection may be maintained. Alternatively, after the connection between the communication apparatus 151 operating in the connection setting mode and the information processing apparatus 101 is disconnected, a new connection may be established between the communication apparatus 151 operating in a mode for performing communication by direct connection and the information processing apparatus 101. In such configurations, connections with two networks are established or maintained by the STA/STA function even after the completion of the connection setting. Here, the primary network for the print application is not limited in particular and may be either of the networks. The primary network may be switched as appropriate depending on the function that the print application performs.

The exemplary embodiments of the present disclosure can be implemented by processing for supplying a program for implementing one or more functions of the foregoing exemplary embodiments to a system or an apparatus via a network or a storage medium, and reading and executing the program by one or more processors in a computer of the system or apparatus. A circuit (for example, application-specific integrated circuit (ASIC)) for implementing one or more functions can also be used for implementation.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-139685, filed Sep. 2, 2022, which is hereby incorporated by reference herein in its entirety.

What is claimed is:

1. A control method of an information processing apparatus including a predetermined program for causing a printing apparatus to perform printing, the control method comprising:

executing predetermined processing for using a second network for communication by the predetermined program on a basis that the information processing apparatus belongs to a first network and the second network in parallel, the first network being formed by an external apparatus and based on a predetermined wireless communication standard, the information processing apparatus functioning as a station in the first network, the second network being formed by the printing apparatus, not connected to Internet, and based on the predetermined wireless communication standard, the information processing apparatus functioning as a station in the second network; and performing communication with the printing apparatus using the second network after the predetermined processing is executed.

2. The control method according to claim 1, wherein the predetermined processing is executed on a basis that the information processing apparatus belongs to the first network and the second network in parallel and the second network is a network corresponding to predetermined information that is not obtained from the printing apparatus but stored by the predetermined program in advance.

3. The control method according to claim 2, wherein the predetermined information is at least one of an Internet Protocol (IP) address, a service set identifier (SSID), and a media access control (MAC) address.

4. The control method according to claim 1, wherein the predetermined processing is processing for using the second network for the communication by the predetermined program without using the first network.

5. The control method according to claim 1, wherein the predetermined processing is instructing an operating system of the information processing apparatus to use the second network for the communication by the predetermined program.

6. The control method according to claim 1, wherein in a case where the information processing apparatus belongs to the first network and the second network in parallel, use of the first network for the communication by the predetermined program is controlled before the predetermined processing is executed.

7. The control method according to claim 1, wherein an operating system of the information processing apparatus is configured to control the first network to be preferentially used for the communication by the predetermined program, the operation system supporting a function that allows the information processing apparatus to belong to the first network and the second network in parallel.

8. The control method according to claim 1, wherein the predetermined processing is executed by a station/station (STA/STA) Concurrency function on the basis that the information processing apparatus belongs to the first network and the second network in parallel.

9. The control method according to claim 1, wherein the communication with the printing apparatus using the second network includes communication for performing network setting of the printing apparatus.

10. The control method according to claim 9, wherein the communication with the printing apparatus using the second network includes communication for connecting the printing apparatus to an access point forming the first network.

11. The control method according to claim 9, wherein the communication with the printing apparatus using the second network includes communication for obtaining a list of networks discovered by the printing apparatus through a search, and communication for transmitting information for connecting the printing apparatus to one of networks included in the list.

12. The control method according to claim 9, wherein the communication with the printing apparatus using the second network includes communication for transmitting a print job to the printing apparatus.

13. The control method according to claim 1, further comprising determining whether a version of an operating system of the information processing apparatus is a predetermined version supporting a function that allows the information processing apparatus to operate as a station and connect to a plurality of networks, wherein the predetermined processing is executed on a basis that the information processing apparatus belongs to the first network and the second network in parallel and the version of the operating system of the information processing apparatus is determined to be the predetermined version.

14. The control method according to claim 1, further comprising determining whether an operating system of the information processing apparatus is a predetermined operating system supporting a function that allows the information processing apparatus to operate as a station and connect to a plurality of networks, wherein the predetermined processing is executed on a basis that the information processing apparatus belongs to the first network and the second network in parallel and the operating system of the information processing apparatus is determined to be the predetermined operating system.

15. The control method according to claim 14, wherein the predetermined operating system is Android™.

16. The control method according to claim 1, wherein the predetermined processing is executed in a state where the information processing apparatus belongs to the first network and the second network in parallel.

17. The control method according to claim 1, wherein the second network and the information processing apparatus are disconnected from each other based on completion of the communication with the printing apparatus using the second network.

18. The control method according to claim 1, wherein the predetermined wireless communication standard is an Institute of Electrical and Electronics Engineers (IEEE) 802.11 series communication standard.

19. An information processing apparatus including a predetermined program for causing a printing apparatus to perform printing, the information processing apparatus comprising:
- an execution unit configured to execute predetermined processing for using a second network for communication by the predetermined program on a basis that the information processing apparatus belongs to a first network and the second network in parallel, the first network being formed by an external apparatus and based on a predetermined wireless communication standard, the information processing apparatus functioning as a station in the first network, the second network being formed by the printing apparatus, not connected to Internet, and based on the predetermined wireless communication standard, the information processing apparatus functioning as a station in the second network; and
- a communication unit configured to perform communication with the printing apparatus using the second network after the predetermined processing is executed.

20. A non-transitory storage medium storing a program for causing a computer of an information processing apparatus including a predetermined program for causing a printing apparatus to perform printing to execute a control method, the control method comprising:
- executing predetermined processing for using a second network for communication by the predetermined program on a basis that the information processing apparatus belongs to a first network and the second network in parallel, the first network being formed by an external apparatus and based on a predetermined wireless communication standard, the information processing apparatus functioning as a station in the first network, the second network being formed by the printing apparatus, not connected to Internet, and based on the predetermined wireless communication standard, the information processing apparatus functioning as a station in the second network; and
- performing communication with the printing apparatus using the second network after the predetermined processing is executed.

* * * * *